(12) United States Patent
King et al.

(10) Patent No.: US 6,353,839 B1
(45) Date of Patent: *Mar. 5, 2002

(54) METHOD FOR INLINE VARIABLES MANAGEMENT IN A HYPERMEDIA DISPLAY LANGUAGE

(75) Inventors: Peter F. King, Half Moon Bay; Russell S. Greer, Los Gatos; Bruce V. Schwartz, San Mateo; Bruce K. Martin, Jr., Palo Alto; Mark G. Lentczner, Mountain View; Lawrence M. Stein, San Jose, all of CA (US)

(73) Assignee: Openwave Systems Inc., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,235

(22) Filed: Apr. 30, 1998

(51) Int. Cl.[7] .............................................. G06F 17/21
(52) U.S. Cl. ..................................................... 707/513
(58) Field of Search ............................... 707/501, 513, 707/501.1; 374/43.25, 90.01; 709/202–203, 217–219; 345/352–354

(56) References Cited

U.S. PATENT DOCUMENTS

| 5,623,656 | A | * | 4/1997 | Lyons ......................... 395/610 |
| 5,838,906 | A | * | 11/1998 | Doyle et al. ............ 395/200.32 |
| 5,907,704 | A | * | 5/1999 | Gudmundson et al. ...... 395/701 |
| 5,928,324 | A | * | 7/1999 | Sloan ........................... 709/203 |
| 5,930,341 | A | * | 7/1999 | Cardillo et al. ........... 379/93.25 |
| 5,948,066 | A | * | 9/1999 | Whalen et al. .............. 709/229 |
| 5,961,601 | A | * | 10/1999 | Iyengar ....................... 709/229 |
| 5,966,535 | A | * | 10/1999 | Benedikt et al. ............. 395/707 |
| 5,991,760 | A | * | 11/1999 | Gauvin et al. ................. 707/10 |
| 6,011,546 | A | * | 1/2000 | Bertram ....................... 345/327 |
| 6,065,120 | A | * | 5/2000 | Laursen et al. .............. 713/201 |
| 6,076,099 | A | * | 6/2000 | Chen et al. .................. 709/202 |
| 6,108,406 | A | * | 8/2000 | Mitchell et al. .......... 379/93.25 |

OTHER PUBLICATIONS

Flanagan, David, "JAVA in a Nutshell", May 1997, O'Reilly, 2nd Edition, pp. 131–134, 239–241.*
"HDTP Specification," *Unwired Planet, Inc.*, Version 1.1, Part No. HDTP–SPEC–DOC–101, Jul. 15, 1997, pp. 1–40.
"HDML 2.0 Language Reference," *Unwired Planet, Inc.*, Version 2.0, Part No. HDMLREF–DOC–200, Revision D, Jul. 1997, pp. 1–56.
Phifer, Lisa, "Surfing the Web Over Wireless", pp. 1–6, <http://www.corecom.com/html/wireless.html> Jan. 1998.*
"Web Phones", Byte Magazine, Aug. 1996, 3 pages from Internet, <http://www.byte.com/art/9608/sec14/art1.htm> Aug. 1996.*
Quint, Vincent, "Comment on HDML Submission", W3C, 2 pages from Internet, <http://www.w3.org/Submissions/1997/5/Comment.html> Jan. 1998.*

(List continued on next page.)

*Primary Examiner*—Joseph H. Feild
(74) *Attorney, Agent, or Firm*—Joe Zheng; Alan D. Minsk

(57) ABSTRACT

To accept, store, and use dynamic information within a markup language, a markup language variable system is introduced. The markup language variable system allows variable scopes to be created within markup language user agents. Variables can then be assigned using static variable assignment via markup language tags or dynamic variable assignment via user requests. Variables can be used within markup language displays or within addresses such as Uniform Resource Locators (URLs). Automatic escaping ensures that variables are correctly modified for use within certain contexts such as URLs.

30 Claims, 6 Drawing Sheets

OTHER PUBLICATIONS

Gundavaram, Shisir, CGI Programming on the World Wide Web, O'Reilly & Associates, pp. 47, 48, 56, 57, 268–271, 389, 390, Mar. 1996.*

Johnson, Marc, JavaScript Manual of Style, Ziff–Davis Press, pp. 14–17, 67–73, 145–150, 169–180, Dec. 1996.*

Khare, Rohit et al (editors), Scripting Languages: Automating the web, O'Reilly& Associates, pp. 87–95, 211–215, Apr. 1, 1997.*

Light, Richard, Presenting XML, Sams.net Publishing, pp. 134, 135, 139, 291–294, Dec. 1997.*

Microsoft Press Computer Dictionary, third edition, Microsoft Press, pp. 166, 278, Dec. 1997.*

Oliver, Dick et al, Sams' Teach Yourself HTML 4 in 24 Hours, second edition, pp. 35, 249–255, 258, 259, 369–371, Dec. 1997.*

Morris, Mary E. S., HTML for Fun and Profit, SunSoft Press, pp. 51, 52, 97, 98, Dec. 1996.*

Schwartz, Randal L. et al, learning Perl, second edition, O'Reilly & Associates, p. 6–8, 21, Jul. 1997.*

* cited by examiner

METHOD FOR INLINE VARIABLES MANAGEMENT IN A HYPERMEDIA DISPLAY LANGUAGE

FIELD OF THE INVENTION

The present invention relates to the field of computer languages. In particular the present invention discloses methods for inline variable management into a hypermedia display language.

BACKGROUND OF THE INVENTION

The Internet is a rapidly growing communication network of interconnected computers around the world. Together, these millions of connected computers form a vast repository of hyperlinked information that is readily accessible by any of the connected computers from anywhere at any time. To provide mobility and portability of the Internet, wireless computing devices were introduced and are capable of communicating, via wireless data networks, with the computers on the Internet. With the wireless data networks, people, as they travel or move about, are able to perform, through the wireless computing devices, exactly the same tasks they could do with computers on the Internet.

The most common remote access paradigm is, as of today, the one in which a laptop personal computer is equipped with a wireless communication mechanism, for example, a wireless modem. This paradigm may remain useful for a considerable number of applications and users, but there has been a growing need for a mobile paradigm in which the Internet can be instantly accessed by mobile devices, such as mobile phones and personal digital assistants (PDA). With increasing data processing capabilities in the mobile devices, more and more users are carrying such devices around to materialize their unproductive time into productive time.

To increase portability and mobility, most mobile devices are designed small in size, light in weight, low in power consumption, and as economical and portable as possible. Such thin designs often have very limited computing resources, for example, their computing power is, perhaps, typically equivalent to less than one percent of what is provided in a typical desktop or portable computer, their memory capacity is generally less than 250 kilobytes and their LCD display is perhaps four lines high by twelve or twenty characters, and their graphics capabilities are very limited or nearly nonexistent and their input interface is often a keypad having far fewer buttons than a PC keyboard does. These design constraints generally seen in a mobile device make implementing browsers for Internet navigation quite difficult. For example, conventional browsers for desktop personal computers are notorious for requiring large amounts of disk space, large amounts of memory, and powerful processors.

One particular difficulty in implementing a browser on a handheld device is the problem of incorporating client state information into display pages. There are typically two common methods of implementing client state information into display pages. A first method of incorporating client state information into a display page is to ask the user for some information and then incorporate that information into a newly generated display page. This method works well for computers on the Internet but does not work well for wireless handheld devices such as the mobile devices that generally can not effectively handle user supplied information locally for immediate display. Hence the user supplied information has to be sent back to a server where the user supplied information is processed and incorporated into new display pages that are then returned to the mobile devices. The disadvantages of this method when used in the mobile devices are evident as the network round-trip introduces additional latency and causes unnecessary network traffic. Another method commonly used in computers on the Internet is to use a scripting language, such as JavaScript and ActiveX, to take in and incorporate the user supplied information when displaying a hypermedia page. The method, however, proves to be too complicated to be used in the mobile devices. Thus, there is a great need for a generic solution to managing the client state information into display pages in thin client devices like the mobile devices.

SUMMARY OF THE INVENTION

The present invention has been made in consideration of the above described problems and has particular applications to the navigation of Internet web pages using thin devices, such as a mobile computing device, a mobile device, a landline telephone, and an Internet-capable appliance controller. The present invention discloses methods for inline variable management in a hypermedia display language. The variables are named pieces of information that can be substituted in a hypermedia display language or markup language with respect to user supplied information when constructing a display page. Thus, the present invention solves the problem of using client state in displays without the necessity of the server round-trip and without incurring all the memory and processing requirements of a full scripting language.

According to one aspect of the present invention, a client process that interprets the markup language with variables is designed to identify and properly respond to the variables inserted into the markup language at runtime. Variables are identified by a "key" and contain a text "value." Hypertext content may contain references to variables by the key. Variables may be set statically using markup language tags, dynamically using user input, or may contain data from the client environment. During the processing and display of the hypertext, the values of the variables are substituted into the hypertext as indicated by the variable references according to a text substitution method.

According to another aspect of the present invention, the disclosed system provides mechanisms to create variable scopes. In one embodiment, activities are created that include activity frames that store variables associated with the activities. Methods are presented to allow variable information to pass between different activities. To ensure an activity would not expose sensitive information kept locally in a client process, the disclosed system uses a set of parameters to protect those private activities from general public activities.

In one embodiment, activities may be created by navigating within hypertext documents such that a markup that defines a new activity is created.

Accordingly, an important object of the present invention is to provide mechanisms to efficiently manage client state information in a hypermedia display language;

Other objects, together with the foregoing are attained in the exercise of the invention in the following description and resulting in the embodiment illustrated in the accompanying drawings.

BRIEF DESCRIPTION OF THE DRAWINGS

The features and advantages of the present invention will be apparent to one skilled in the art, in view of the following detailed description in which:

FIGS. 3A to 3E illustrate screen displays resulting from respective exemplary code listings herein to facilitate the description of the present invention.

DETAILED DESCRIPTION OF THE PREFERRED EMBODIMENT

Methods for implementing variables in a markup language are disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the Handheld Device Markup Language (HDML). However, the same techniques can easily be applied to other markup languages. Thus, the present invention is not intended to be limited to the embodiments shown, but is to be accorded the widest scope consistent with the principles and features disclosed herein.

Mobile Devices and HDML

Figure 1:
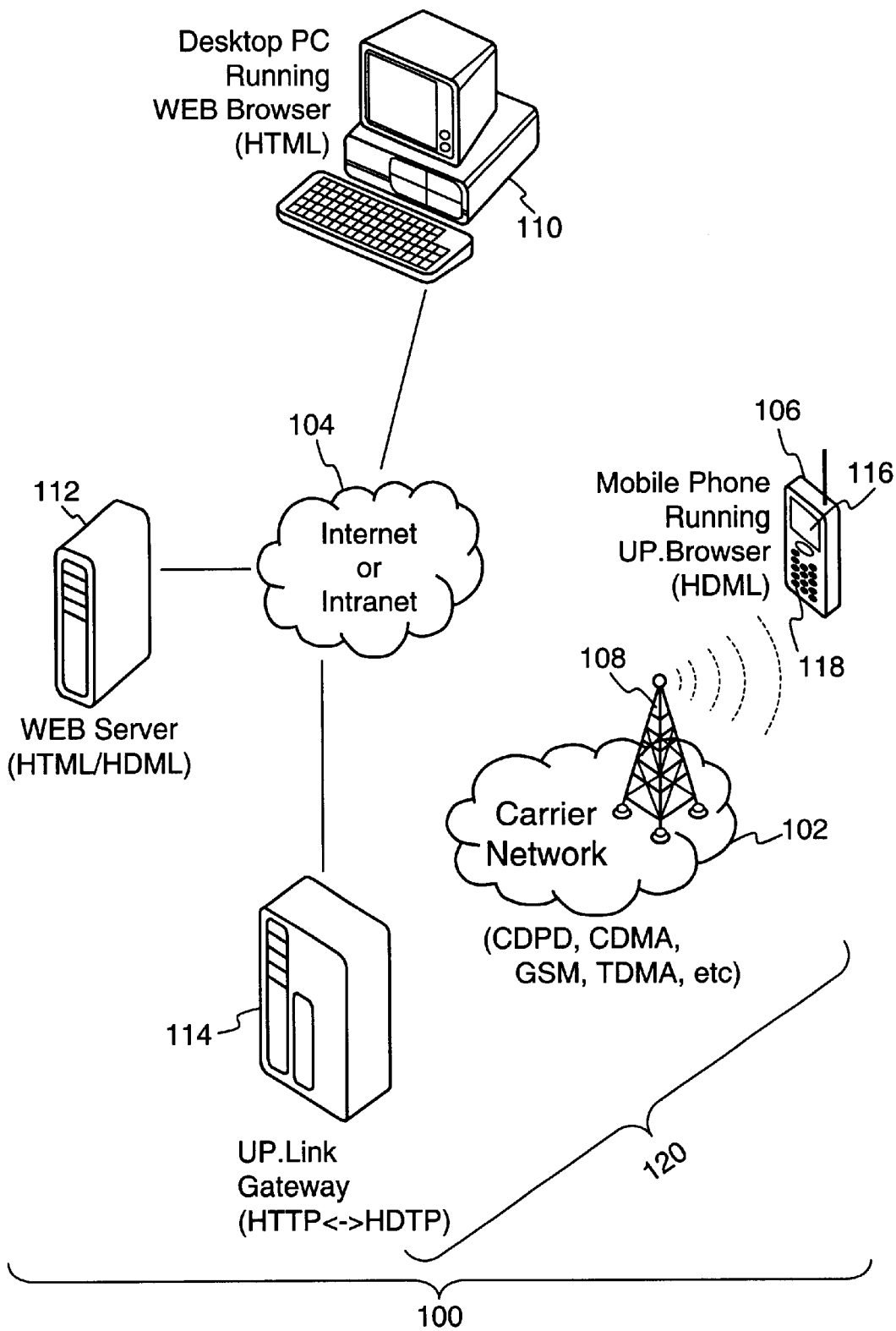
FIG. 1 illustrates one embodiment of a data network in which the present invention may be practiced.

FIG. 1 illustrates a schematic representation of a data network 100 in which the present invention may be practiced. The data network 100 comprises an airnet 102 that is generally called wireless network and a landnet 104 that is generally a landline network, each acting as a communication medium for data transmission therethrough. The airnet 102, in which the data transmission is via the air, is sometimes also referred to as a carrier network because each airnet is controlled and operated by a carrier, for example AT&T and GTE, each having its own communication scheme, such as CDPD (Cellular Digital Packet Data) and Code Division Multiple Access (CDMA), for the airnet 102. The landnet 104 is a land based network such as the global Internet, an Intranet, or other private networks. A two-way communication device 106 can be a mobile computing device, a mobile device, a cellular phone, a landline telephone, or an Internet appliance controller, capable of communicating with the airnet 102 via an antenna 108. It is generally understood that the airnet 102 may carry the communications of a plurality of two-way communication devices simultaneously, of which only one mobile device 106 is shown in the figure.

Similarly, connected to the Internet 104 are a plurality of desktop Personal Computers (PCs) 110 and a plurality of server computers 112, though only one representative respectively is shown in the FIG. 1. The PC 110, as shown in the figure, may be a personal computer SPL 300 from NEC Technologies Inc. and runs a HyperText Markup Language (HTML) Web browser. The web browser communicates via the Internet 104 using HyperText Transfer Protocol (HTTP) to access information stored in web servers, such as web server 112 that may be a workstation from Sun Microsystems Inc. It is understood to those skilled in the art that the PC 110 can also store accessible information therein so as to become a web server as well.

Situated between the Internet 104 and the airnet 102 is a link server 114 that communicates data therebetween. A link server 114, also referred to as link proxy or gateway, may be a workstation or a personal computer, and performs mapping or translation functions, for example, communication protocol mapping from one protocol to another. Thus a mobile device 106 can be in communication with any one of the servers 112 or the PCs 110, respectively.

HyperText Transport Protocol (HTTP) is a well-known communication protocol on the Internet 104. HTTP runs on the well-known Transmission Control Protocol (TCP). HTTP controls the connection of an HTML Web browser to a Web server and the exchange of information therebetween. The communication protocol between the mobile device 106 and the link server 114 via the airnet 102 is Handheld Device Transport Protocol (HDTP). The HDTP preferably runs on User Datagram Protocol (UDP) and controls the connection of a Handheld Device Markup Language (HDML) Web browser to a link server. Handheld Device Markup Language (HDML), similar to that of HTML, is a tag based document language and comprises a set of commands or statements specified in a card that specifies how information is displayed on a small screen of the mobile device 106. In HDML, a number of "cards" are grouped into a "deck" that is the smallest unit of HDML information that can be exchanged between the mobile device 106 and the proxy server 114.

There are typically four types of cards, an entry card, a display card, a choice card, and a no-display card. Regardless of the types, a card can contain text and images. It should be understood that the present invention is not limited to these particular types of cards. The definition of the particular types of cards is used to facilitate a description of the invention and to assist developers in organizing applications. To be more specific, a display card gives information to display to the user. The displayed content can include any one of, or any combination of text, an image, and one or more soft keys. A choice card displays a list of choices for the user. The choices are automatically presented in a format specified on the choice card and generally numbered accordingly. As explained above, the user makes a choice by depressing a key corresponding to the choice. An entry card, generally displaying one or more entry lines, is used to obtain input data from the user. Typically, each entry line includes a display followed by an entry line. The entry line, in one embodiment, can be for either numeric or text data. A no-display card is a hidden card not for the purpose of being displayed. The no-display card is normally used to execute an intermediate action and generally not known to a user. More description of the HDML cards and deck will be included below wherever appropriate. The specifications of HDTP, entitled "HDTP Specification" and HDML, entitled "HDML 2.0 Language Reference" are enclosed and incorporated herein by reference in its entirety.

HDTP is a session-level protocol that resembles the HTTP but without incurring the overhead there of, and is highly optimized for use in thin devices that have significantly less computing power and memory. Further it is understood to those skilled in the art that the UDP does not require a connection to be established between a client and a server before information can be exchanged, which eliminates the need of exchanging a large number of packets during a session creation between a client and a server. Exchanging a very small number of packets during a transaction is one of the desired features for a mobile device with very limited computing power and memory to effectively interact with a landline device.

The link server 114, as the name suggests, links the aimet 102 to the landnet 104. Nevertheless, it can be appreciated that the link server 114 can function as a web server as well, providing information service directly to the mobile devices that are in communication with the link server 114 using HDTP. Being coupled to the landnet 104 using HTTP, the link server 114 can further provide information service to the PCs 100 or the workstations 112 and equally fetch information therefrom. Therefore in the following description, the link server or a web server is indistinguishably used to mean a server device that primarily provides information service to one or more mobile devices.

It is understood to those skilled in the art that a uniform resource locator (URL) is usually provided in order to access pertinent information in a server device. An example of a URL for a web document prepared in HDML is:

http://www.news.com/hypertext/usnews.hdml

The URL indicates that by using the HTTP protocol to reach a server device identified by www.news.com, there is a directory "hypertext" that contains a hypertext document named "usnews.hdml" that is displayable on client device 106 employing an HDML process, a micro-browser or a browser.

Figure 2:
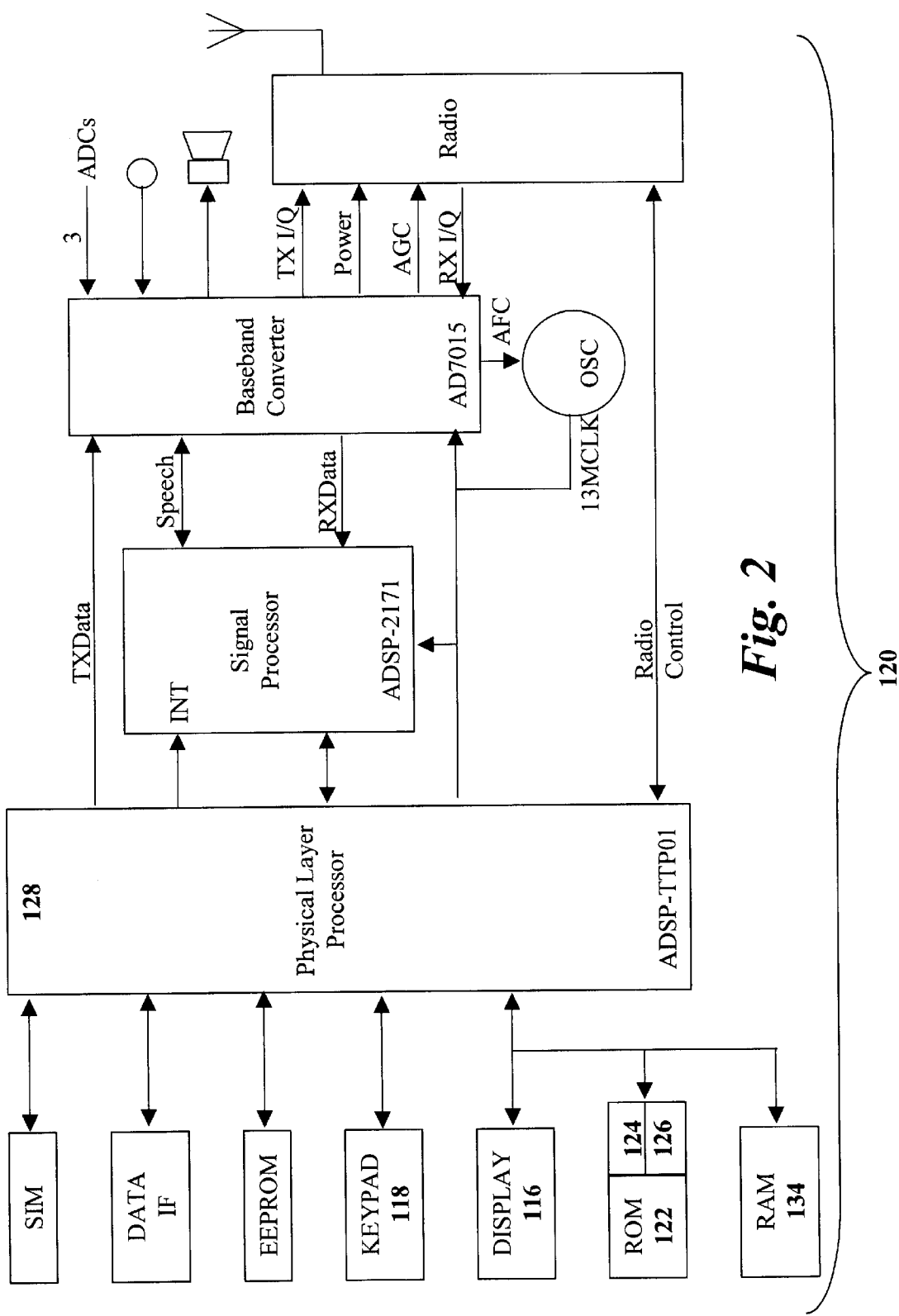
FIG. 2 illustrates a block diagram of a typical digital mobile device that can be used in the data network of FIG. 1 to practice the present invention.

FIG. 2 illustrates a block diagram of a typical digital mobile phone 120 that can be used in the arrangement of FIG. 1 to practice the present invention. Each of the hardware components in the mobile phone 120 is known to those skilled in the art and so the hardware components are not described in detail herein. With the display screen 116 and the keypad 118, a user of the phone 120 can interactively communicate with a server device (not shown in FIG. 2) over a data network.

According to one embodiment, compiled and linked processes of the present invention are stored in ROM 122 as a client module 124 and a support module 126. Upon activation of a predetermined key sequence utilizing the keypad 118, a physical layer processor or microcontroller 128 initiates a communication session request to the server device using the module 124 in the ROM 122. Upon establishing the communication session, the phone 120 typically receives a single HDML deck from the server device and stores the deck as cached in RAM 134. Each deck has a unique address identifier such as a URL and includes one or more cards. A card includes the information required to generate a screen display on the display screen 116. Thus, a deck is simply a group of screen displays. The number of cards in a card deck is selected to facilitate efficient use of the resources in the mobile device and in the airnet network. A display driver (not shown) receives and interprets information from the deck in the RAM and causes the screen 116 to display the information accordingly. The keypad driver (not shown) receives signals representing what buttons or keys in the keypad are depressed and converts the signals to a representation understood by the microcontroller 128 that in turn responds, for example, by activating a respective card in the deck or a new link to the server for a new deck if necessary depending on what choice is made through the phone keypad 118.

Client State within Web Pages

In most cases, all the information a browser needs to display a web page is contained with a HTML document and its associated linked images. The information may reside in a single server or the information may reside in multiple different computers. Such web pages are referred to as "static" web pages since all the information needed to generate the display is immediately available and does not change.

Although static web pages, are useful, there are many situations where it is desirable to incorporate dynamic information that can be used when displaying web pages. For example, to create personalized web pages it would useful to incorporate local client state into web pages. One method of incorporating additional information into a web page is to ask the user for some information, and then incorporate that information into a newly generated web page. Specifically, a user of an HTML client device can create state information by setting HTML "form" fields. The mechanism for using HTML form field state information is to send the information in a request to a server, either as query parameters in a URL or as the body of an HTTP POST method. The server is then responsible for parsing the form data and dynamically inserting the data or some derivative into the next HTML page to be displayed.

For example, to create personalized web pages it would useful to incorporate local client state into web pages. One method of incorporating additional information into a web page is to ask the user for some information and then incorporating that information into a newly generated web page. Specifically, a user of an HTML client can create state information by setting HTML form fields. The mechanism for using that state information is to send the information in a request to a server either as query parameters in a URL or as the body of an HTTP POST method. The server is then responsible for parsing the form data and dynamically inserting the data or some derivative into the next HTML page to be displayed.

However, this method of inserting dynamic information does not work well for wireless handheld devices such as devices that use HDML. Specifically, this method provides unacceptable performance. In particular, the network round-trip introduces long latency period when using wireless networks. Furthermore, sending state information up to the server only to have it come back down to the client in another form is a waste of network bandwidth. Finally, HDML decks that include variable data can not be effectively cached as any change in the data results in an entirely new page or deck. In other words, there is no ability to have a "template" page in the cache that is reused regardless of the state it displays.

Another method of allowing state information to be used is to introduce a scripting language. This technique is used by HTML browsers, such as desktop computers connected to the Internet. Specifically, ActiveX and JavaScript allow state information to be used in HTML browsers. Both ActiveX and JavaScript provide full programming languages with object models, built-in libraries, security mechanisms etc. However, these environments are sufficiently complex to make them untenable on small, handheld devices. For example, the memory requirements of those scripting languages exceeds the memory available in handheld devices.

Markup Language Variables

To introduce state information into a markup language, the present invention introduces variables and variable management into a markup language. Variables can be used in a markup language in order to substitute specific client state information when constructing a screen display. The specific context of the preferred embodiment of the present invention is HDML and an HDML browser. It is understood to those skilled in the art that the teachings of the present invention apply to other markup languages, such as HTML, XML (Extensible Markup Language), WML (Wireless Markup Language). As described in more detail below, the present invention solves the problem of using client state in displays without the necessity of the round-trip to a server and incurring all the complexity of a scripting language.

For a client process to interpret a hypertext document with variables, variables are identified by a "key" and contain a text "value." Hypertext content (such as HDML) may contain simple variable references within display pages. Variables may also be placed into hyperlink tags. During the processing and display of the hypertext, the values of the variables are substituted into the hypertext as indicated by the variable references according to the text substitution method described below.

Static Variable Assignment

According to one embodiment, VARS option is used as a tag to set the value of a variable. In another embodiment, the VARS option may be used with the GO or GOSUB tasks that will be described later. For example, the option "VARS=var1=Washington&var2=Lincoln" would set variable var1 to "Washington" and variable var2 to "Lincoln". The ampersand symbol ("&") is used to separate several variable assignments. The following markup language code illustrates static variable assignment:

```
<HDML VERSION=2.0>
    <DISPLAY NAME=card1>
        <ACTION TYPE=ACCEPT TASK=GO
            VARS="var1=California&var2=Minnesota" DEST=#card2>
        I'm setting two variables.
    </ DISPLAY >
    <DISPLAY NAME=card2>
        <ACTION TYPE=ACCEPT TASK=GO DEST=#card1>
        var1 = $var1 <BR>
        var2 = $var2
    </DISPLAY>
</HDML>
```

Figure 3A:
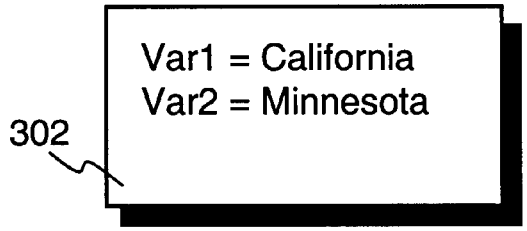

In the above example, the variables var1 and var2 are set to California and Minnesota respectively. The resultant screen display is shown on a display screen 302 in FIG. 3A. As used herein, a display screen is the physical display apparatus in a device, such as a 4 by 20 character LCD screen. A screen display is the image presented on the display screen.

Dynamic Variable Assignment Using the User Interface

In the system of the present invention, variables can also be bound to user-interface elements by using the CHOICE and ENTRY tags. This takes the form of specifying the key of the variable to be bound to a particular user-interface element.

The ENTRY tag is used to set a variable from user input. The ENTRY tag requires a "key" parameter that specifies the key of the variable in which to store any text entered. When the user enters text, the value of the key variable is updated to reflect the new information. The following exemplary HDML code allows a user to set the variable "ursname" with a user name supplied by a user:

```
<ENTRY NAME=nameentry KEY=usrname DEFAULT=Bob>
    <ACTION TYPE=ACCEPT TASK=GO DEST=#greeting>
    Your name:
</ENTRY>
```

Figure 3B:
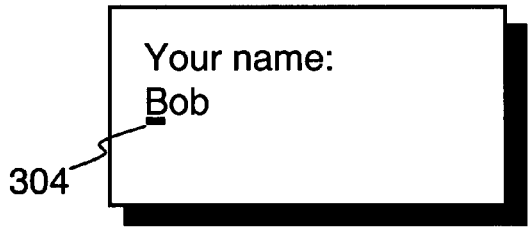
Figure 3A:
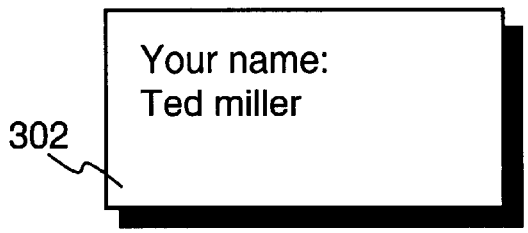

As shown in FIG. 3B, the default value "Bob" is placed into the variable ursname. It should be noted that the default value "Bob" is optional. A cursor 304 indicates the initial position for the user to enter preferred information. For example, the user enters a new name "Ted Miller" that overwrites the default value. Variable ursname is assigned to be Ted Miller when the user finishes the entry. The resultant screen display on the display screen 302 is shown in FIG. 3C.

The CHOICE tag is preferably used to display a menu with a limited set of choices that may be selected by the user. With the CHOICE tag, the "key" parameter specifies the key of the variable in which to store the value of the selected choice entry. Furthermore, an "ikey" parameter specifies the key of the variable in which to store the index of the selected choice entry. When the user selects a particular choice entry, the values of these variables are updated to reflect the new information. The following code provides an example usage of the CHOICE tag.

```
<HDML VERSION=2.0>
    <CHOICE KEY=ch IKEY=num IDEFAULT=2 NAME=chcard>
        <ACTION TYPE=ACCEPT TASK=GO
            DEST="#dispvar">
        <CE VALUE=Hogs>Live hogs
```

-continued

```
        <CE VALUE=Bellies>Pork bellies
        <CE VALUE=Cattle>Feeder cattle
    </CHOICE>
    <DISPLAY NAME=dispvar>
        <ACTION TYPE=ACCEPT TASK=GO DEST=#chcard>
        num = $num <BR>
        ch = $ch
    </DISPLAY>
</HDML>
```

Figure 3D:
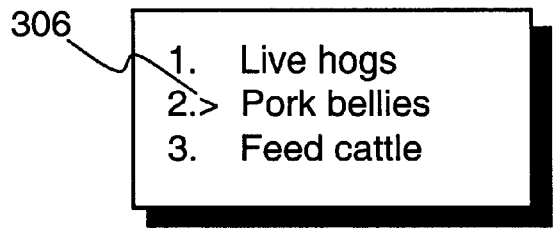
Figure 3E:
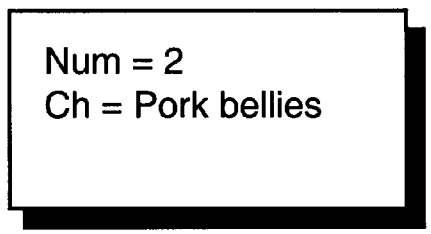

In the above example, the CHOICE tag specifies an HDML Choice card. The "KEY=ch" option sets the ch variable as the variable that will be assigned the user's choice. The "IKEY=num" option specifies that the num variable will store the index number of the user's choice where "1" is the first possible choice, "2" is the second possible choice, and so on. The "IDEFAULT=2" option specifies the default choice to be choice number 2. The corresponding screen display is shown in FIG. 3D in which arrow sign 306 is a choice indicator identifying a choice is being selected by the IDEFAULT. The user can move the choice indicator 306 up and down to a desired choice through a keying mechanism such as arrow keys in a keypad. FIG. 3E illustrates the display card that would be displayed if choice 2 was selected from the choice card of FIG. 3D.

Variable Usage

After a variable has been assigned, the variable can be displayed using "Text substitution." Text substitution replaces variable references within the markup language with the text value associated with the variable. Referencing a variable which has no value (an unset variable) results in the substitution of an empty string. In one embodiment of the present invention, variable references are identified by a "$" followed by the variable key. The variable key may optionally be enclosed in parenthesis "(" and ")" to disambiguate the variable reference from the surrounding text. To give an example of text substitution in HDML, consider the following client variable state:

| Variable Key | Variable Value |
|---|---|
| user | Ted Miller |
| date | Feb. 3, 1998 |

Then, during text substitution, the following markup language code will expand from this:

<HDML version=2.0>
  <DISPLAY>
    My name is $user, and the date is $(date).
  </DISPLAY>
</HDML> with the user supplied information to this:

<HDML version=2.0>
  <DISPLAY>
    My name is Ted Miller, and the date is Feb. 3, 1998.
  </DISPLAY>
</HDML Note that in this example, the parentheses "( )" around the word "date" are optional. However parentheses are preferred in certain circumstances.

The text substitution machinery of the present invention operates by performing late-binding in-line substitution of variable values into the hypertext content. Late-binding refers to the fact that the substitution of the variable value occurs at the last possible opportunity during processing. For example, if hypertext content is loaded and then displayed, the substitution takes place during the display, not the loading. This allows variables to change values and have the new values be reflected in the hypertext content with minimal processing. The substitution machinery is conducted in-line, in which variable references are placed directly into the hypertext content and then are replaced with the values of the variables during the text substitution.

The client process may also convert the text from one form to another during text substitution. For example, if the value of the variable is going to be inserted into a URL, it should be appropriately escaped using the known URL escaping conventions. To specify a specific type of conversion, the key of the variable is usually in parentheses and a colon ':' and a conversion command are appended to the key. For example, to URL escape the variable "user", the following syntax is used:

$(user:escape)

Using the same data from the previous example, "$(user:escape)" will return the following text:

Ted+Miller

Note that in URL escaping, spaces are replaced with '+' characters so that the URL contains no whitespace. Detailed information can be found in the Internet Engineering Task Force (IETF) Request For Comments (RFC) publication number 1738 (RFC 1738) by T. Berners Lee, et al.

According to one embodiment of the present invention, the client process supports context-sensitive automatic conversion. Context-sensitive conversion automatically converts text during text substitution in a manner that is dependent upon the placement of the variable in the HDML content. Specifically, variable references may be automatically converted during text substitution, in a context specific manner. For example, if a variable reference is placed in a tag parameter that takes a URL as its value, the variable will automatically be escaped in a manner for URL usage during text substitution. This automatic conversion mechanism dramatically reduces the burden on the programmer to do escaping correctly and reduces the likelihood of bugs being introduced by incorrect escaping. The following HDML options are all automatically URL escaped: ACCESSDOMAIN, ACCESSPATH, BOOKMARK, CANCEL, DEST, GO, IMAGE, NEXT, and SRC.

For example, the following HDML ACTION tag contains a URL destination (DEST) parameter that requires a URL to be expanded. The variable value ("Ted Miller") is automatically converted using URL escaping from this:

<ACTION TASK=GO DEST="foo.cgi?user=$user"> to this:

<ACTION TASK=GO DEST="foo.cgi?user=Ted+Miller">Note that URL escaping was not explicitly specified in this particular variable reference, however, URL escaping was performed automatically since the "DEST" parameter always refers to a URL parameter.

Variable State Management

A variable's "scope" defines when and where a variable is active. Several different models may be used to define a variable's scope.

Deck Based Variable Scopes

A first method of defining the scope of variables is to use a deck-based variable scope system. As previously set forth, HDML information is divided into decks that are further subdivided into cards. In one embodiment, each HDML deck can be an independent variable scope such that when a user navigates from one deck to another deck, a new variable scope is created. In other markup languages, "page-based" scope or "document-based" scope may be more appropriate, depending on the organization paradigm used by the markup language.

Named Variable Scopes

A second method of defining the scope of variables would be to use a user named variable scope system. In a named variable scope system, each new card or deck could specify the name of a particular variable scope that the card or deck uses. Thus, different cards or decks could share the same variable scope by using the same variable scope name. New variable scopes can be created for cards or decks that need a new variable scope. Each newly created variable scope is given a new name.

Activity Based Variable Scopes

Figure 4A:
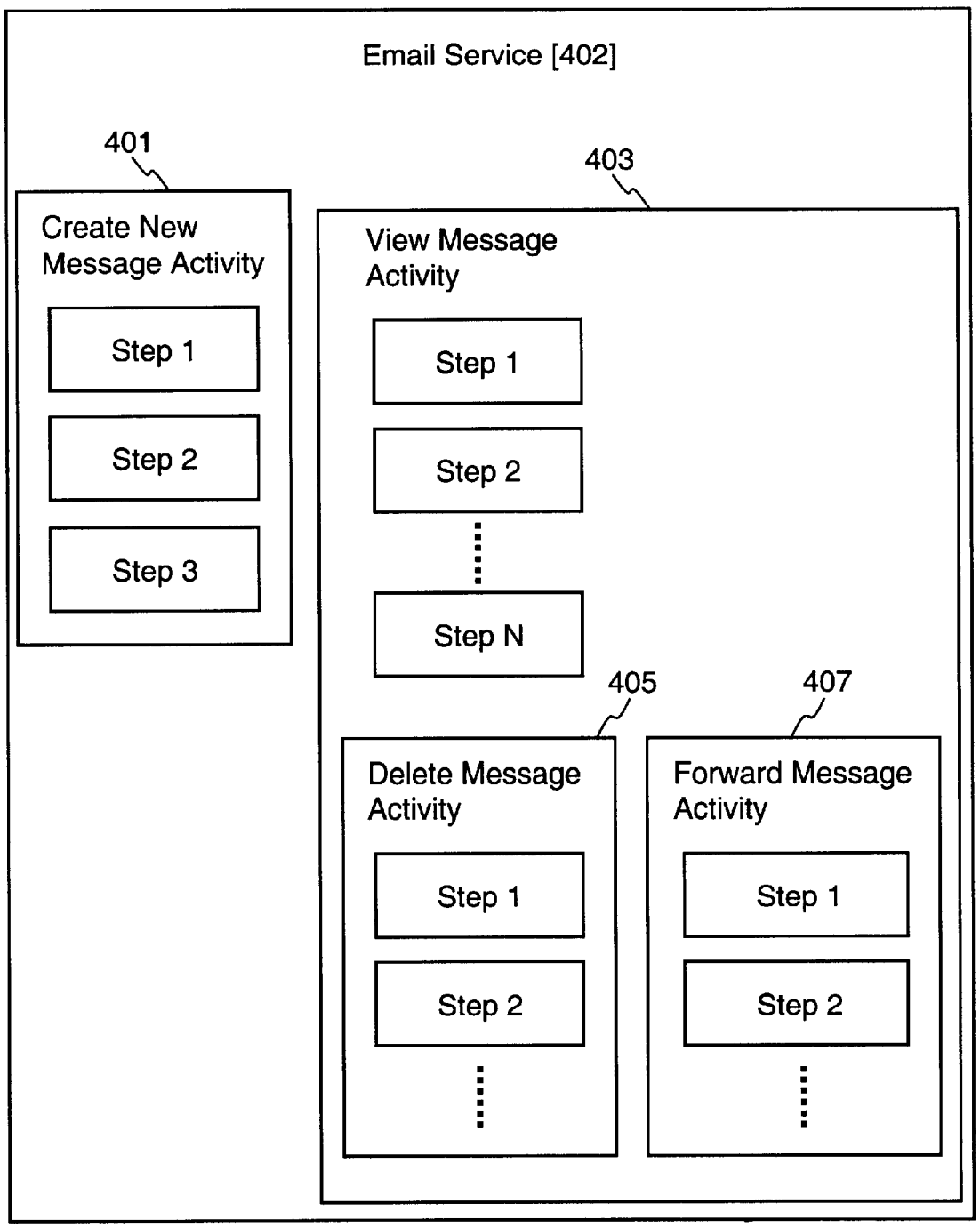
FIG. 4A illustrates a conceptual diagram of a service consisting of more than one activity.

A third embodiment, a preferred embodiment, of the present invention uses "Activities" to determine variable scope. An activity is a set of HDML cards with an associated set of variables. An activity is thus similar to a subroutine in high level programming languages. FIG. 4A illustrates a conceptual diagram of a few activities. In FIG. 4A several email activities make up an email service 402. In the example of FIG. 4A, only two email activities are shown: create new message activity 401 and view message activity 403. Each activity can have sub-activities. In the example of FIG. 4A, view message activity 403 includes two sub-activities: delete message activity 405 and forward message activity 407.

The variables used by an activity are stored in an "activity frame" associated with an activity. An activity frame comprises a table of variable key and value pairs. One activity frame is identified as the "current" activity frame. This current activity frame contains the set of variables currently available. The currently available variables can be set, modified, or used during text substitution.

Activity frames are organized in a Last-In First-Out (LIFO) stack known as the activity stack. A new activity frame is created by pushing a new activity frame on the activity stack. This new activity is known as a sub-activity. The old activity is known as the super-activity to the new activity. When a new activity frame is pushed on the stack, no variables are defined other than those explicitly passed during the activity creation. When an activity ends, the activity frame is popped off the stack making the super-activity's variable scope (activity frame) available again. There is a mechanism for the sub-activity to set variables in activity frames 411, 413, 415, and 417. The activity frame at the top of the stack, activity frame 417, is the current activity frame. The activity frame 415 is the super-activity of the current activity frame 417. Each activity frame contains variables that have been defined within that activity frame.

The activity stack is, to some degree, integrated with the client program's navigational history mechanism. A sub-activity may be created as a side effect of navigating forward. An activity may be terminated (or popped off the activity stack) when the user navigates backward from the entry point of the activity. However, activities may be created and terminated without user navigation.

To control activity frames, one embodiment of the present invention defines certain markup language "tasks." The following tasks are used to specify user navigation and control variable state management:

| Task | Function |
| --- | --- |
| GO | The GO task is the normal task for navigating forward. The GO task loads new hypermedia and pushes a new URL entry on the navigation history stack but no new activity frame is created. The VARS option can be used with the GOSUB task to set variables in the new activity frame. |
| GOSUB | The GOSUB task is similar to the GO task. However, the GOSUB task pushes a new activity frame onto the activity stack. The VARS option can be used with the GOSUB task to set variables in the new activity frame. The RECEIVE option can be used with the GOSUB task to provide a list of variables that may be returned by the sub-activity. The NEXT parameter can be used with the GOSUB task to set the URL to requrest when the sub-activity returns using the RETURN task. The CANCEL parameter can be used with the GOSUB task to set the URL to request if the sub-activity terminates using the CANCEL task. The FRIEND parameter can be used to determine if the sub-activity is "friendly" such that it will be allowed to use the DEST and CLEAR options when it returns. |
| PREV | The PREV task is the normal task for navigating backward. Specifically, the previous entry on the navigation history stack is displayed. |
| RETURN | The RETURN task terminates the current activity (the current activity frame is popped off the activity stack) and returns to the URL specified by the NEXT parameter in the GOSUB. A RETVALS option can be used with the RETURN task to specify an ordered list of variables to return. The GOSUB task that invoked the current activity specifies what will occur when a RETURN task is encountered (where to return to and what variables should be returned). However, if this is a "friendly" sub-activity, then a DEST option can be used to specify the URL to return to and a CLEAR option can be used to unset all the variables of the super-activity that created the sub-activity. |
| CANCEL | The CANCEL task is an alternate method of terminating the current activity. The GOSUB task that invoked the current activity specifies what will occur when a CANCEL task is encountered. If this is a "friendly" sub-activity, then a DEST option can be used to specify the URL to return to and a CLEAR option can be used to unset all variables of the super-activity that created the sub-activity. | the super-activity's variable scope (activity frame), as described below. Furthermore, a sub-activity may clear the variables in the super-activity if the sub-activity is authorized.

A navigational history stack is also maintained by the client system as the user navigates through hypermedia. As each new piece of content is displayed, its URL is pushed on the navigational history stack. This allows the user to easily go backwards through the content he or she has viewed simply by popping URLs off the navigational history stack.

Figure 4B:
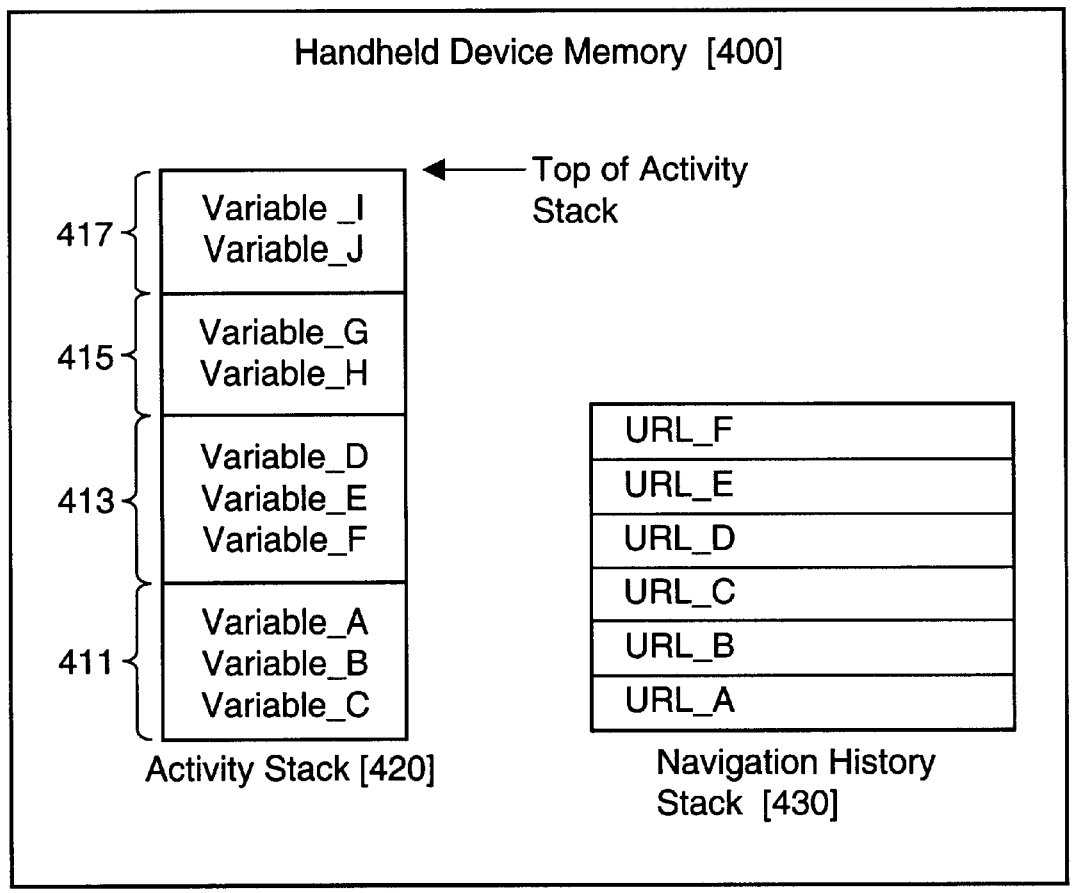
FIG. 4B illustrates a conceptual diagram of a handheld device's memory containing an activity stack and a navigation history stack.

FIG. 4B illustrates a conceptual diagram of a handheld device's memory 400 that contains an activity stack 420 and a navigational history stack 430. The navigational stack 430 currently has six URLs. The activity stack 420 contains four Variables within an activity frame can be set during forward navigation. Specifically, the <ACTION> tag includes a VARS parameter which specifies new values for variables. When executing a GO task, the client sets the value of the variables in the current activity frame. When executing a GOSUB task, the client sets the value of the variables in the sub-activity that is created by the GOSUB task.

Variables can also be set during backward navigation. Specifically, variables can be set when returning from a sub-activity. The <ACTION> tag may use the RECEIVE and RETVALS parameters which, in combination, allow an activity to return data to its super-activity. The RECEIVE parameter is used in the GOSUB task of the super-activity, to specify by position, the keys of the variables in which to return stored data. The RECEIVE parameter specifies a semicolon delimited ordered list of values that will receive variables returned by the sub-activity. The RETVALS parameter is used in the RETURN task of the sub-activity to specify an ordered list of values to return to the super-activity. Specifically, the RETVALS parameter is a semicolon delimited ordered list of variables to return to the super-activity.

The integration of the activity stack and the navigation history stack make activities useful for providing non-local navigation (in addition to variable state management). There are situations where a sub-activity needs to have more control over a super-activity than is normally provided. Such control is acceptable because the sub-activity is really part of the same application. For example, a sub-activity can be defined to allow a user to edit a list that is in the variable scope of the super-activity. If one of the editing operations is to delete the entire list, it does not make sense to return to the hypertext that displays the list. Rather, you would want to return to a new card that says the list is empty. In this case, the sub-activity knows that the state of the super-activity has changed significantly.

The present invention provides a method that allows a sub-activity access to the variables in the super-activity. Specifically, when executing the GOSUB task, the super-activity can specify that the sub-activity is "friendly" by setting a "friend" parameter. The friend parameter specifies that the sub-activity is allowed to perform the following addition functions: (1) The sub-activity can remove all the variables from the super-activity (by using the CLEAR parameter); and (2) The sub-activity can specify what URL to display when a RETURN or CANCEL task is encountered (by using the DEST parameter).

Figure 5:
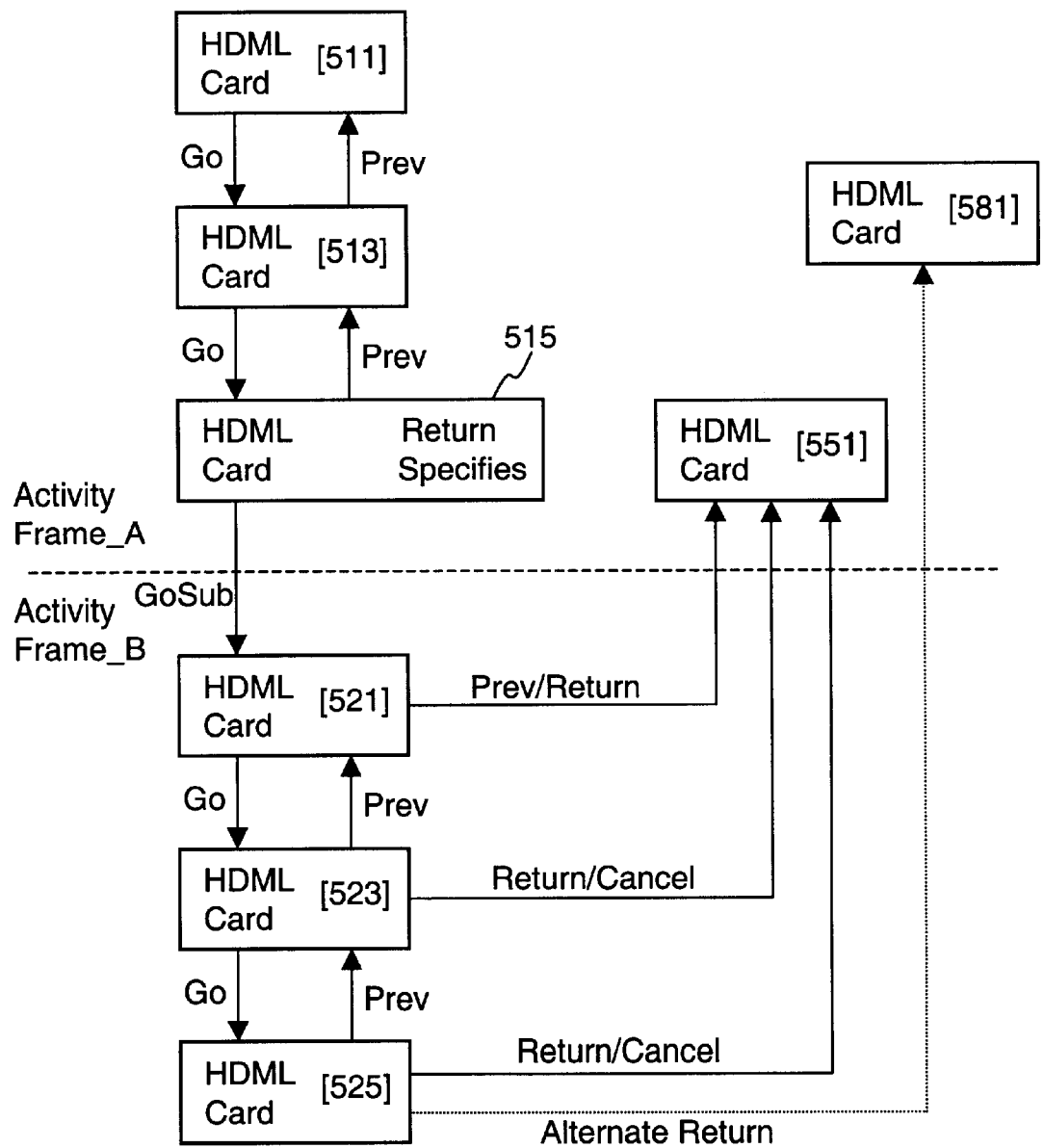
FIG. 5 illustrates a conceptual diagram of a user navigating in HDML and the navigational effects on an activity stack and a navigation history stack.

FIG. 5 illustrates an example embodiment of the present invention wherein user navigation affects an activity stack and a navigation stack. FIG. 5 is a conceptual diagram that follows possible user navigation. Referring to FIG. 5, HDML card 511 represents an example starting point. HDML card 511 has an associated URL that has already been pushed onto the navigation stack. HDML card 511 includes a link to HDML Card 513 that uses a GO task. If the user follows the link to HDML card 513 then the URL for HDML card 513 is pushed onto the navigation history stack and HDML card 513 is displayed. The GO task may contain a VAR parameter that allows variables in the current activity frame to be set.

HDML card 513 includes a link to HDML card 515 using a GO task. If the user follows the link from HDML card 513 to HDML card 515 then the URL for HDML card 515 is pushed onto the navigation history stack and HDML card 515 is displayed.

HDML card 515 includes a link to HDML card 521 using a GOSUB task. If the user follows the link from HDML card 515 to HDML card 521 then the URL for HDML card 521 is pushed onto the navigation history stack, a new activity frame is created, and HDML card 521 is displayed. Thus, the GOSUB task caused a new activity frame to be created. The GOSUB task will specify variables that should be created in the new activity and where the navigation should return to when a RETURN or CANCEL task is encountered. In the example of FIG. 5, HDML card 515 specifies HDML card 551 as the return location. The GOSUB task may contain a RECEIVE parameter that specifies a list of variables that the new sub-activity may set.

HDML card 521 includes a link to HDML card 523 using a GO task. If the user follows the link from HDML card 521 to HDML card 523 then the URL for HDML card 523 is pushed onto the navigation history stack and HDML card 523 is displayed. If PREV task is encountered in HDML card 521, then the client will go back to HDML card 521. However, if a RETURN task is encountered in HDML card 523, then the client will go to HDML card 551 which was specified as the return URL. When a return is encountered, the current activity frame is popped off the activity stack.

HDML card 523 includes a link to HDML card 525 using a GO task. If the user follows the link from HDML card 523 to HDML card 525 then the URL for HDML card 525 is pushed onto the navigation history stack and HDML card 525 is displayed. If a RETURN task is encountered, the client would normally go to HDML card 551 as specified in the GOSUB task. However, if FRIENDS=TRUE when the activity was created, then the return parameter can be altered such that, if a RETURN task is encountered, the client will go to the new return destination (such as HDML card 581, as shown in FIG. 5).

Client Security

Since a facility for allowing potentially sensitive information to be stored on the client has been defined, there are serious security considerations. For example, if an activity has the user enter sensitive information, the activity must make sure the information is not returned to an untrusted super-activity in order to protect the sensitive information. Thus, an activity needs to be able to restrict the super-activities that may call it.

To provide such security, an HDML deck can specify which decks are allowed to link to it using PUBLIC, ACCESSPATH, and ACCESSDOMAIN parameters. These parameters effectively secure sub-activities that return sensitive information in that the protected sub-activities can only be accessed by certain trusted decks. The PUBLIC parameter specifies if a deck may be publicly accessed by any other deck. If the PUBLIC parameter is TRUE, then any deck may link to the activity. If the PUBLIC parameter is FALSE, then the ACCESSPATH and ACCESSDOMAIN parameters specify the decks that may access the deck. The default PUBLIC value is FALSE.

The ACCESSDOMAIN parameter the domain of URLs that may access a non public deck. The default value is the current deck's domain.

The ACCESSPATH parameter specifies the base path of URLs that are allowed to request secure cards within a nonpublic deck. The default value is "/" (the root of the current deck's path) such that any deck within the current domain may access the secure cards in the deck. Additional information about the access control algorithm and processing of the ACCESSPATH and ACCESSDOMAIN parameters is described in the HDML specification.

Note that this access control is performed within the client system because the private deck may reside in the client cache. The server can not perform access control if the request is never sent to the server.

The foregoing has described a method for implementing variables in a markup language. It is contemplated that changes and modifications may be made by one of ordinary skill in the art, to the materials and arrangements of elements of the present invention without departing from the scope of the invention.

We claim:

1. A method of processing a markup language in a thin-client device with an interpreter that does not use an auxiliary scripting language to perform the method, said method comprising:

creating a first new activity frame to store variables in response to a markup; and processing subsequent markup language commands that refer to variables in said first new activity frame.

2. The method as claimed in claim 1 further comprising:
accepting an input from a user; and
storing said input from said user into a variable associated with said first new activity frame.

3. The method as claimed in claim 1 wherein said creating a first new activity frame comprises adding a first new entry on an activity frame stack.

4. The method as claimed in claim 1 wherein said markup further comprises a parameter defining variables in said first new activity frame.

5. The method as claimed in claim 4 further comprising:
creating a first new activity, said first new activity comprising a set of markup language commands.

6. The method as claimed in claim 5 further comprising:
returning a set of variables when said first new activity completes.

7. The method as claimed in claim 5 wherein said markup defining a first new activity further comprises a destination that will be accessed when said first new activity completes normally.

8. The method as claimed in claim 5 wherein said markup defines said first new activity and comprises a destination that will be accessed when said first new activity terminates with a negative indication of success.

9. The method as claimed in claim 5 wherein said markup defines said first new activity and comprises a parameter that specifies if said first new activity is trusted.

10. The method as claimed in claim 9 further comprising:
specifying a new destination that will be accessed after said first new activity completes if said first new activity is trusted.

11. The method as claimed in claim 10 further comprising:
clearing variables in a calling activity from said first new activity if said first new activity is trusted.

12. The method as claimed in claim 5 further comprising:
detecting a markup defining an end of said first new activity; and
destroying said first new activity frame associated with said first new activity.

13. The method as claimed in claim 12 further comprising:
returning a set of variables to a calling activity.

14. The method as claimed in claim 5 further comprising:
detecting a markup defining a second new activity; and
creating a second new activity frame to store variables, said second new activity frame associated with said second new activity.

15. The method as claimed in claim 14 wherein said creating a second new activity frame comprises adding a second new entry on an activity stack.

16. The method as claimed in claim 14 wherein said markup defining a second new activity further comprises a parameter defining variables in said second new activity.

17. The method as claimed in claim 14 wherein said markup defining a second new activity further comprises a list of variables that said second new activity will return to said first new activity when said second new activity completes.

18. A method of processing a markup language in a thin-client device, said method comprising:
calling a secondary markup language deck from a primary markup language deck; and
detecting a public markup in a secondary markup language deck, said public markup defining if said secondary markup language deck is publicly accessible, ceasing processing of said secondary markup language deck if said primary markup language deck is not authorized to access said secondary markup language deck.

19. The method as claimed in claim 18 wherein a determination if said primary markup language deck is authorized to access said secondary markup language deck is based upon an address of said primary markup language deck.

20. The method as claimed in claim 18 further comprising:
detecting an accessdomain markup in said primary markup language deck, said accessdomain markup defining an Internet domain that is authorized to access said secondary markup language deck.

21. The method as claimed in claim 18 further comprising:
detecting an accesspath markup in said secondary markup language deck, said accesspath markup defining a base deck system path of markup language decks that are authorized to access said secondary markup language deck.

22. A method of processing a markup language in a thin-client device that does not use an auxiliary scripting language to perform the method, said method comprising:
parsing markup language file containing a variable reference; and
replacing said variable reference with a variable value when a markup language file containing said variable reference is processed.

23. A method of processing a markup language in a thin-client device that does not use an auxiliary scripting language to perform the method, said method comprising:
accepting user input from said user;
setting a first variable according to said input from said user; and
storing said first variable in a current activity frame.

24. The method as claimed in claim 23 further comprising:
detecting a markup requesting user input, said markup specifying said first variable that will be set by said user input.

25. The method as claimed in claim 24 further comprising:
displaying a menu, said menu comprising at least one menu item; and
setting a second variable according to a menu item selected.

26. The method as claimed in claim 23 wherein user input comprises alphanumeric text.

27. The method as claimed in claim 23 wherein a default parameter specifies a default value of said first variable.

28. A method of processing a markup language file in a thin-client device that does not use an auxiliary scripting language to perform the method, said method comprising:
parsing a string containing a variable reference; and
replacing said variable reference with a variable value modified depending upon the context of said variable reference in said string.

29. The method of claim 28 wherein said variable value is modified to make said variable value acceptable for use in a Uniform Resource Locator.

30. The method of claim 28 wherein said variable reference is replaced with said variable value during the display of said markup language file.

* * * * *